(12) United States Patent
Faerber et al.

(10) Patent No.: US 7,878,581 B2
(45) Date of Patent: Feb. 1, 2011

(54) VEHICLE ROOF COMPRISING A COVER THAT CAN BE DISPLACED ABOVE A FIXED ROOF SECTION

(75) Inventors: Manfred Faerber, Wielenbach (DE); Bernhard Wingen, Feldkirchen (DE)

(73) Assignee: Webasto AG, Stockdorf (DE)

( * ) Notice: Subject to any disclaimer, the term of this patent is extended or adjusted under 35 U.S.C. 154(b) by 302 days.

(21) Appl. No.: 12/160,884

(22) PCT Filed: Jan. 16, 2007

(86) PCT No.: PCT/DE2007/000092
§ 371 (c)(1),
(2), (4) Date: Jul. 14, 2008

(87) PCT Pub. No.: WO2007/079747

PCT Pub. Date: Jul. 19, 2007

(65) Prior Publication Data
US 2010/0164253 A1 Jul. 1, 2010

(30) Foreign Application Priority Data
Jan. 16, 2006 (DE) .................. 10 2006 002 064

(51) Int. Cl.
*B60J 7/047* (2006.01)

(52) U.S. Cl. .............. 296/216.03; 296/216.05
(58) Field of Classification Search ................. 296/216.02–216.05
See application file for complete search history.

(56) References Cited

U.S. PATENT DOCUMENTS 4,877,285 A * 10/1989 Huyer .................. 296/216.03

(Continued)

FOREIGN PATENT DOCUMENTS

DE 103 33 781 2/2005

(Continued)

OTHER PUBLICATIONS

International Search Report for PCT/DE2007/000092 dated Jul. 5, 2007.

*Primary Examiner*—Dennis H Pedder
(74) *Attorney, Agent, or Firm*—Marshall, Gerstein & Borun LLP

(57) ABSTRACT

The invention relates to a vehicle roof comprising a liftable covering element that can be displaced above a fixed roof section. A control mechanism for the covering element is respectively provided on both sides of the covering element. According to the invention, the control mechanism comprises a drive carriage, a rear release lever which is connected to the covering element in the region of the rear edge thereof in an articulated manner, a front release lever which is connected to the covering element in the region of the front edge thereof in an articulated manner, and a coupling lever which is rotatably connected to the front release lever, co-operates with the drive carriage, and can be displaced in a release position in relation to the drive carriage in the longitudinal direction of the vehicle. The displacement of the drive carriage in the direction of the rear of the vehicle causes firstly an outward pivoting of the rear release lever from a closing position of the covering element, and an outward pivoting of the front release lever when an abutment is reached between the drive carriage and the coupling lever.

10 Claims, 11 Drawing Sheets

U.S. PATENT DOCUMENTS

| | | | |
|---|---|---|---|
| 5,618,081 A * | 4/1997 | Nabuurs | 296/216.03 |
| 6,158,803 A | 12/2000 | Reihl et al. | |
| 6,224,146 B1 * | 5/2001 | Willard et al. | 296/216.03 |
| 7,104,598 B2 | 9/2006 | Wingen | |
| 7,178,862 B2 * | 2/2007 | Oechel | 296/216.02 |
| 7,229,127 B2 | 6/2007 | Grimm et al. | |

FOREIGN PATENT DOCUMENTS

| | | |
|---|---|---|
| DE | 20 2004 006391 | 9/2005 |
| EP | 0863817 | 9/1998 |
| EP | 1 533 159 | 5/2005 |
| WO | WO-9814342 | 4/1998 |

\* cited by examiner

VEHICLE ROOF COMPRISING A COVER THAT CAN BE DISPLACED ABOVE A FIXED ROOF SECTION

BACKGROUND OF THE INVENTION

1. Field of the Invention

The invention relates to a vehicle roof comprising a liftable covering element that can be displaced above a fixed roof section.

2. Related Technology

A vehicle roof of this type is known, for example, from EP 0 863 817 B1 and comprises, for deploying and displacing the covering element by means of which a roof opening can be selectively closed or at least partially opened, a respective control mechanism for the covering element located on each side thereof and associated with a guide rail in each case. The control mechanism comprises a front cover carrier which is guided via a control pin in a guide track, so that the front edge of the covering element can be raised. The control mechanism further comprises a deployment mechanism engaging on a rear cover carrier, which deployment mechanism, upon opening, is separated from the covering element through retraction of the latter.

Furthermore, an openable vehicle roof configured as a spoiler roof is known from DE 103 33 781 A1, which vehicle roof comprises a covering element on the underside of which is formed a cover carrier. The cover carrier is provided with a guide which cooperates with a drive carriage. Arranged at the front end of the cover carrier is a slide element which is guided in a track of a guide rail for the covering element, so that the front edge of the covering element is displaced vertically upwards upon deployment. In addition, a locking lever is arranged between the drive carriage and the cover carrier, which locking lever, upon upward swiveling of the covering element to the ventilation position, prevents displacement of the covering element in the longitudinal direction of the vehicle. The locking lever is swivelable by means of a peg of the drive carriage, so that, with a given relative position of the drive carriage and the locking lever, displacement of the covering element in the longitudinal direction of the vehicle is permitted.

THE SUMMARY OF THE INVENTION

The invention provides a vehicle roof of the type mentioned in the introduction, the control mechanism of which has a compact configuration and permits a secure opening operation with respect to the movement of the covering element.

According to the invention, therefore, there is proposed a vehicle roof of the type mentioned in the introduction, in which the control mechanism comprises a drive carriage connected to a drive cable, a rear release lever which is articulated to the covering element in the region of the rear edge thereof, a front release lever which is articulated to the covering element in the region of the front edge thereof and a coupling lever which is connected rotatably to the front release lever, cooperates with the drive carriage and, in a released position, is displaceable with respect to the drive carriage in the longitudinal direction of the vehicle. Starting from a closed position of the covering element, a displacement of the drive carriage, starting from a front end position, in the direction of the rear of the vehicle, first causes an outward swiveling, controlled by a guide track, of the rear release lever, and, upon attainment of an abutment between the drive carriage and the coupling lever, causes a displacement of the covering element in the direction of the rear of the vehicle and an outward swiveling of the front release lever, controlled by a front guide track. Both the rear and the front release levers are therefore swiveled by displacement of the carriage. A separately driven carriage for the front release lever is not required, since the forces required to swivel the front release lever are transmitted from the drive carriage via the coupling lever to the front release lever.

The vehicle roof according to the invention is an externally-sliding roof or spoiler roof, in which, with the roof opening completely open, the movable covering element is slid back over a fixed roof area arranged to the rear of the roof opening. As is usual with such externally-sliding roofs, the release levers may be guided in slot-shaped recesses of the fixed roof area extending in the longitudinal direction of the vehicle. As they are displaced in the slot-shaped recesses, the release levers may deform and displace an elastic rubber seal of the respective slot-shaped recess.

An externally-sliding roof may also be a component of a so-called folding hard-top convertible, in which a sliding roof function first enables partial opening of the roof before the entire roof moves into a stowage compartment, so that the entire interior of the vehicle is open at the top.

In particular, the vehicle roof according to the invention is mirror-symmetrical with respect to the longitudinal center plane of the vehicle, so that it has mutually corresponding control mechanisms on each side of the covering element.

According to the inventive vehicle roof, only the rear release lever is deployed in order to swivel the covering element from a closed position to a ventilation position. In this case, as a result of the relative displaceability of the coupling lever and the drive carriage, the front release lever is substantially uncoupled from the drive carriage when the deployment movement takes place.

In a preferred embodiment of the vehicle roof according to the invention, the rear guide track for controlling the swiveling movement of the rear release lever is formed on the drive carriage. The swiveling movement of the rear release lever is therefore independent of the configuration of other structural elements of the vehicle roof.

In order to ensure a precise swiveling movement of the rear release lever, the latter preferably has a front and a rear control slider which are guided in the rear guide track formed on the drive carriage. A further mounting of the rear release lever in the region of the associated guide rail is then unnecessary.

Furthermore, in a particular embodiment of the vehicle roof according to the invention, the front guide track which controls the swiveling movement of the front release lever is fixed rigidly to the roof, opening into a guide track of the respective guide rail. As the covering element is moved in the direction of the rear of the vehicle, the front release lever can then be displaced securely in the deployed state.

In order to provide a control mechanism which is rigid in compression in the longitudinal direction of the vehicle as the covering element is displaced, relative movement between the drive carriage and the coupling lever in the longitudinal direction of the vehicle is preferably blocked during the displacement operation. Relative movement between the front and rear release levers is therefore also blocked.

In order to prevent a seal arranged in the region of the front edge of the roof opening from being crushed as the covering element is deployed to the ventilation position, the coupling lever preferably executes a swiveling movement as the rear release lever is deployed, which swiveling movement causes a displacement of the coupling lever in the longitudinal direction of the vehicle, so that the front edge of the covering element is moved away from a front edge of the roof opening as a result of the coupling of the coupling lever to the front release lever.

Displacement of the coupling lever as the rear release lever is deployed is preferably controlled by a locking channel fixed rigidly to the roof, in which locking channel a locking peg formed on the coupling lever engages, which locking peg secures the front release lever, and therefore the covering element, against undesired displacement in the longitudinal direction of the vehicle as the covering element is deployed, and which locking peg is guided in a guide track of the guide rail as the covering element is displaced and prevents the coupling lever from being swiveled.

The swiveling movement of the coupling lever is preferably effected by a displacement of the drive carriage and by means of a control track.

The control track is preferably formed on the coupling lever and is provided with a rear locking section in which a peg of the drive carriage is arranged during displacement of the covering element. The locking section of the control track is preferably oriented substantially vertically, so that the peg of the drive carriage bears against an edge of the locking section and can thus transmit a pulling or pushing movement to the coupling lever and therefore to the front release lever. In an alternative embodiment, the control track may be implemented in a corresponding form on the drive carriage, in which case the peg is formed on the coupling lever.

In order to stabilize the control mechanism in the region of the connection between the coupling lever and the front release lever, the connection between these two elements is preferably effected in the region of the front slide element, which is guided in the respective guide rail. In a particular embodiment, the slide element may also serve as a connecting component, so that the coupling lever and the release lever are then each articulated to the slide element.

An especially simple connection of the covering element to the control mechanism is made possible by a preferred embodiment of the vehicle roof according to the invention, in which the front release lever and the rear release lever are connected to one another via a covering element carrier. Of course, the covering element carrier may also be configured in multiple parts, so that the front release lever is articulated to one part and the rear release lever to another part of the covering element carrier.

Further advantages and advantageous configurations of the subject matter of the invention are apparent from the description, the drawing and the claims.

BRIEF DESCRIPTION OF THE DRAWINGS

An embodiment of the vehicle roof according to the invention is represented in schematically simplified form in the drawing and is explained in more detail in the following description. In the drawing.

DETAILED DESCRIPTION

Figure 1:
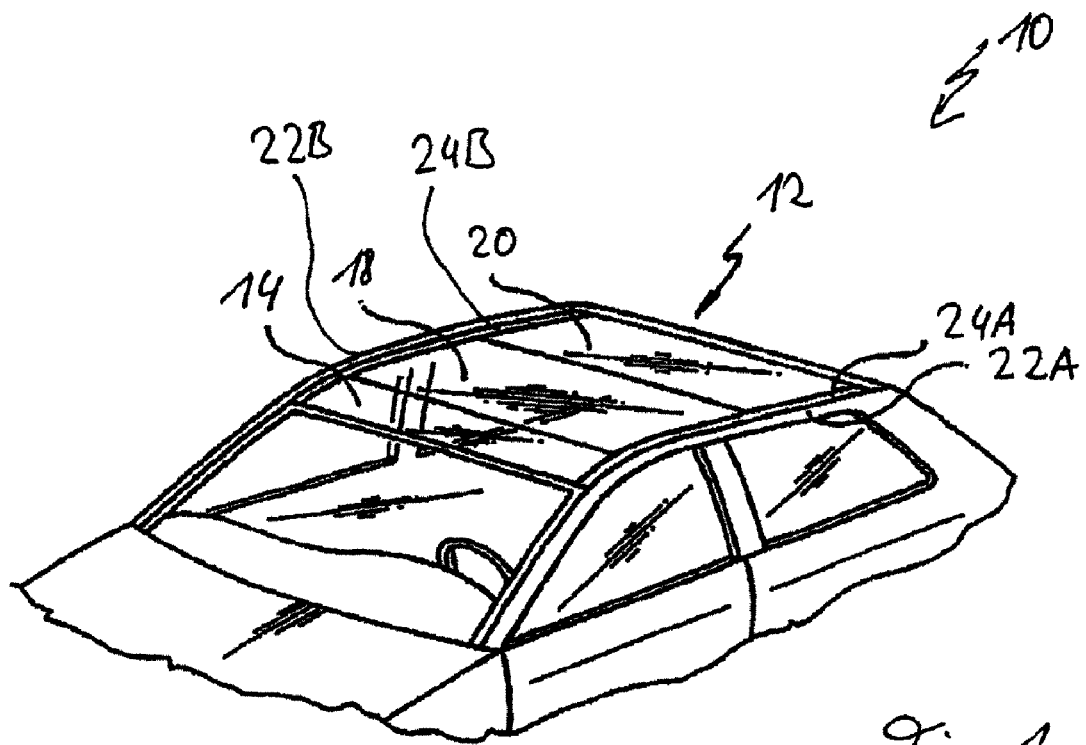
FIG. 1 is a partial view of a motor vehicle with a vehicle roof according to the invention, the roof opening being closed.
Figure 2:
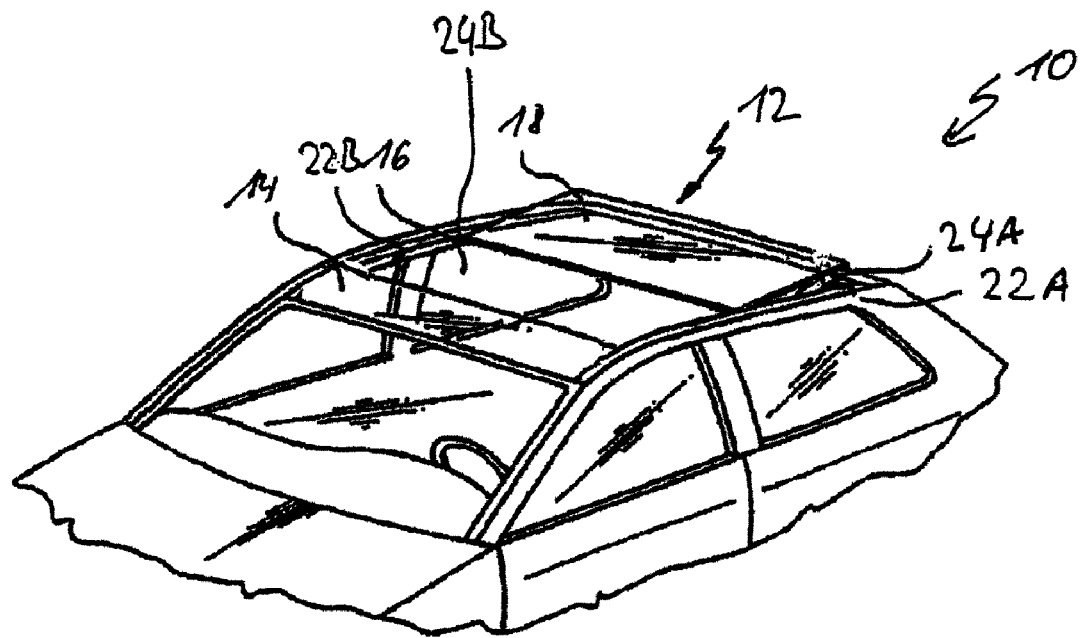
FIG. 2 is a view corresponding to FIG. 1 with the roof opening open.
Figure 3:
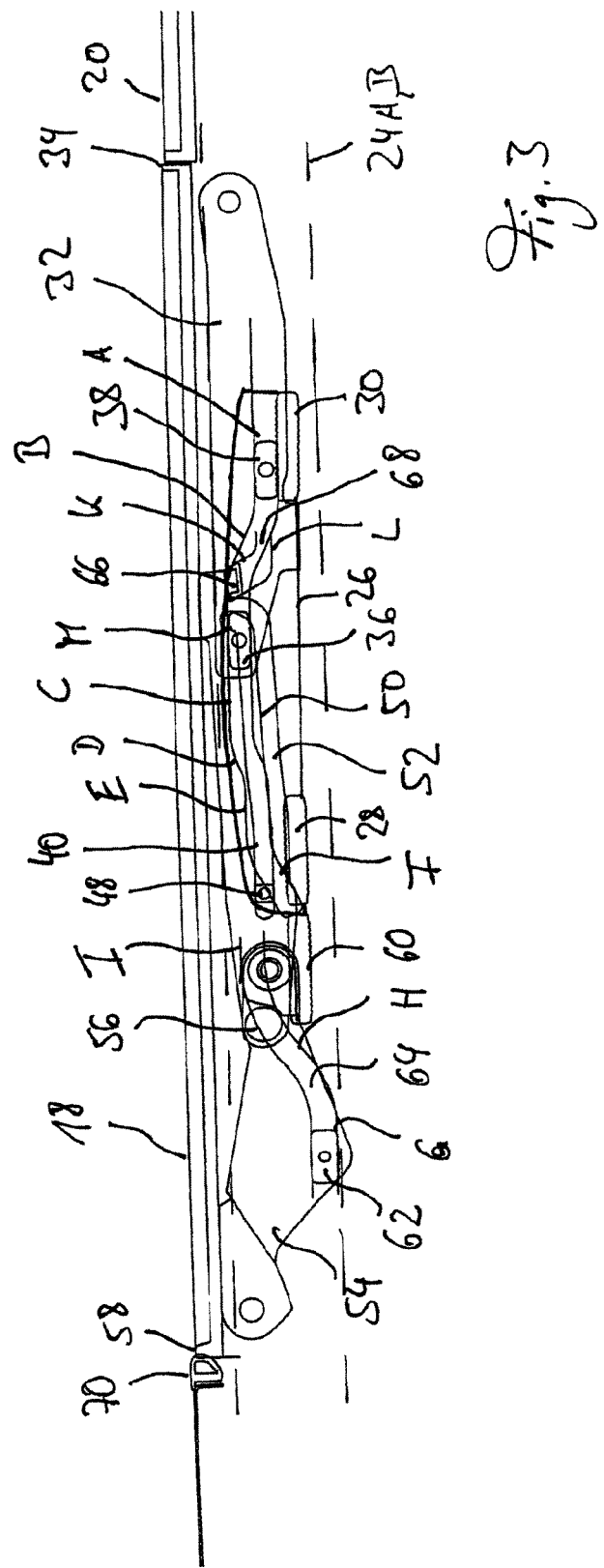
FIG. 3 shows a schematic longitudinal section through the vehicle roof in the region of a control mechanism in the closed position of the covering element.
Figure 4:
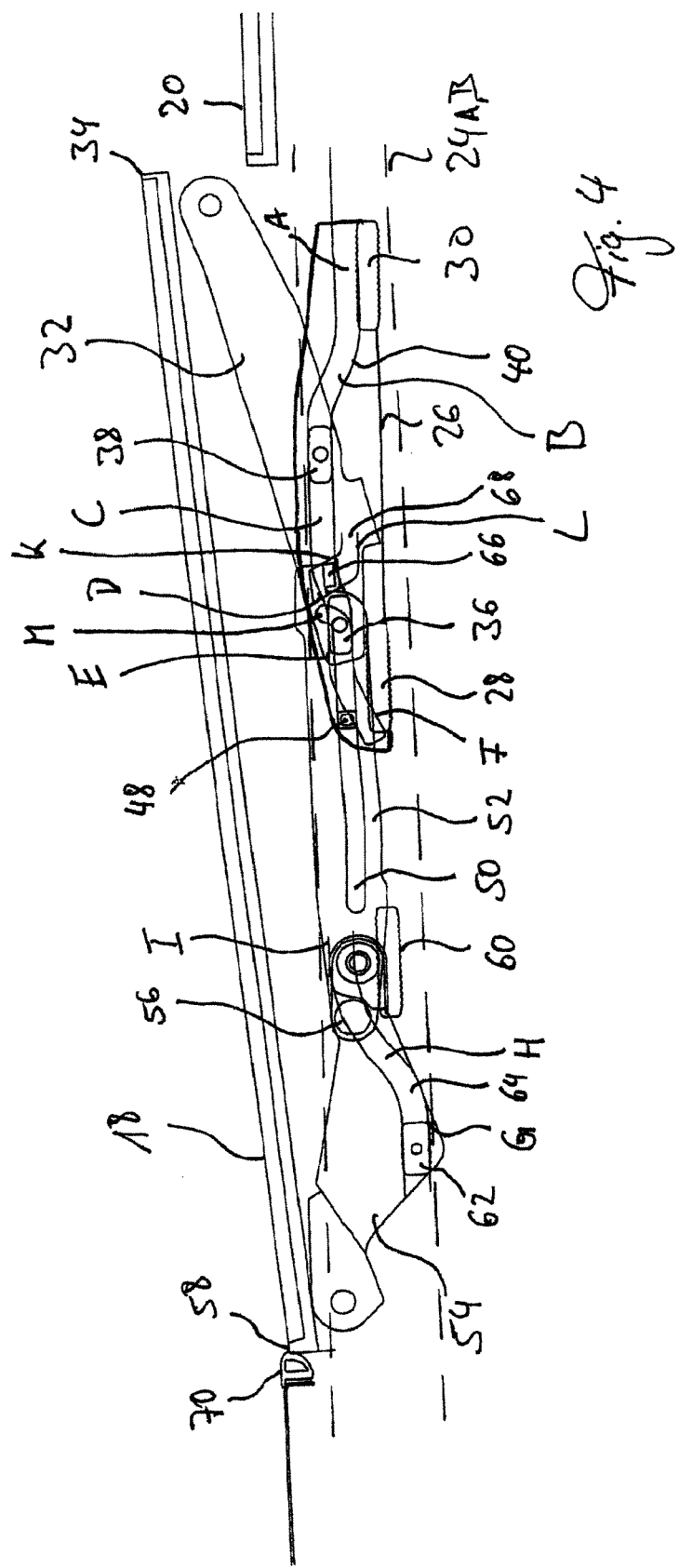
FIG. 4 is a view corresponding to FIG. 3 with the covering element in the ventilation position.

FIGS. 1 and 2 show a motor vehicle 10 which is in the form of a passenger car and has a vehicle roof 12 according to the invention. The vehicle roof 12 comprises a windscreen cowl 14 which delimits at the front a roof opening 16 which can be selectively closed or at least partially opened by means of a movable covering element 18. A fixed roof section 20 adjoins the roof opening 16 at the rear. The windscreen cowl 14, the roof opening 16 and the fixed rear roof section 20 are delimited laterally by roof side members 22A and 22B extending in the longitudinal direction of the vehicle.

The covering element 18 is in the form of an externally-sliding roof cover which therefore, when opening, can first be deployed at its rear edge and moved to a ventilation position and can then be moved over the fixed rear roof section 20. For this purpose the covering element 16 is guided on both sides in lateral guide rails 24A and 24B extending in the longitudinal direction of the vehicle. The guide rails 24A and 24B are each covered at least in their regions located laterally beside the fixed rear roof section 20 by a seal (not shown in detail here) which, as the covering element 16 is displaced, yields to functional elements, described below, of a control mechanism for the covering element 16 which is described in more detail with reference to FIGS. 3 to 12.

The control mechanism, which is illustrated in FIGS. 3 to 12 for one of the two guide rails 24A, 24B and is configured mirror-symmetrically for the other of the two guide rails, comprises a drive carriage 26 connected to a drive cable which is rigid in compression and is connected to a drive motor (not shown in detail here), which drive carriage 26 is guided in guide tracks of the respective guide rail 24A, 24B by means of respective front and rear slide elements 28, 30 arranged in pairs.

The drive carriage 26 cooperates with a rear release lever 32 which is articulated rotatably to the covering element 18 in the region of a rear edge 34 thereof.

The rear release lever 32 has two control elements 36 and 38 which are mounted rotatably on respective studs and are guided in a rear guide track 40 of the drive carriage 26. The rear guide track 40 of the drive carriage 26 has a rear horizontal section A which adjoins at the front a section B which rises in the direction of the front of the vehicle and which in turn is adjoined by a middle horizontal section C. The middle horizontal section C, which is arranged higher than the rear horizontal section A, is in turn adjoined by a section D which descends in the direction of the front of the vehicle and adjoins a front horizontal section E, which is arranged at a height between the rear horizontal section A and the middle horizontal section C and is adjoined by a front section F, which descends in the direction of the front of the vehicle.

A guide track 42 which follows a path identical to that of the guide track 40 is arranged on the other side of the drive carriage 26. A further control element 44 of the release lever 32, which control element 44 is mounted rotatably in a U-shaped bracket 46 of the rear release lever 32, engages in the guide track 42. The control element 44 ensures a symmetrical application of force and stable support of the covering element 18 in the rear edge region thereof. In principle, however, the function of the release lever 32 is also ensured by the two control elements 36 and 38 alone.

The control carriage 26 has in its front end region a laterally projecting peg 48 which engages in a control track 50 of a coupling lever 52 which couples the drive carriage 26 to a front release lever 54 and is articulated to the latter via a stud 56.

The front release lever 54 is articulated to the covering element 18, firstly in the region of the front end 58 thereof, and secondly in the region of a front slide element 60, which is guided in the guide track of the respective guide rail 24A, 24B of the slide elements 28, 30 of the drive carriage 26. The point of articulation to the slide element 60 is offset with respect to the stud 56 for connecting the coupling lever 52 to the front release lever 54.

Furthermore, the front release lever 54 has a rotatably mounted control element 62 which is guided in a front guide track 64 connected rigidly to a guide rail, which front guide track 64 comprises a front horizontal section G, an adjoining section H rising in the direction of the rear of the vehicle, and a rear horizontal section I, which adjoins a guide track of the respective guide rail 24A, 24B.

The coupling lever 52 has on its end oriented away from the front release lever 54 a locking peg 66 projecting in the direction of the longitudinal center plane of the vehicle, which is guided in a locking channel 68, connected rigidly to a guide rail, which has a front section K rising steeply in the direction of the front of the vehicle, which adjoins in the direction towards the rear of the vehicle a substantially horizontal guide track L of the respective guide rail 24A, 24B.

The control track 50 of the coupling lever 52 has a curving path such that a displacement of the peg 48 of the drive carriage 26, starting from a front end position (FIG. 3), causes downward swiveling of the control lever 52, so that, through the interaction of the locking peg 66 and the locking channel 68, the coupling lever 52, and therefore the slide element 60 and the front release lever 54, are subjected to a small, controlled displacement in the direction of the rear of the vehicle. This is desirable when deploying the covering element 18 to a ventilation position, in order that a seal 70 arranged in the region of a front edge of the roof opening 16 is not excessively crushed.

In addition, the front release lever 54 and the rear release lever 32 are connected to one another via a covering element carrier 72, to which the covering element 18 with the control mechanism can be connected by means of screw fixings 74.

The vehicle roof represented in FIGS. 1 to 12 operates in the manner described below.

In a closed position represented in FIGS. 1, 3, 7 and 10, the movable covering element is disposed substantially flush with the windscreen cowl 14 and the rear, fixed roof section 20. The front release lever 54 and the rear release lever 32 are both lowered and the drive carriage 26 is in a front end position.

If the drive motor for opening the roof opening 16 is now actuated, the drive carriage 26 is displaced by means of the drive cable (not shown) in the direction of the rear of the vehicle. The control elements 36 and 38 of the rear release lever 32 are thereby displaced in the rear guide track 40 to the positions shown in FIG. 4, so that the rear release lever 32 is subjected to a deployment movement and the rear edge 34 of the covering element 18 is raised with respect to the fixed rear section 20. Because the coupling lever 52 is in a released position in relation to the drive carriage 26 and is therefore displaceable with respect thereto in the longitudinal direction of the vehicle, the peg 48 moves simultaneously towards the rear, starting from a front end position, in the control track 50 of the coupling lever 52, so that the locking peg 66, which prevents an undesired displacement of the front slide element 60 in the guide rail 24A, 24B, is moved downwardly in the locking channel 68, whereby a traction force in the direction of the rear of the vehicle is in turn exerted on the control lever 52, the front slide element 60 and the release lever 54, and therefore also on the covering element 18. The front edge 58 of the covering element 18 is therefore moved slightly in the direction away from the front seal 70, so that the latter is not excessively crushed during deployment of the covering element 18.

Figure 5:
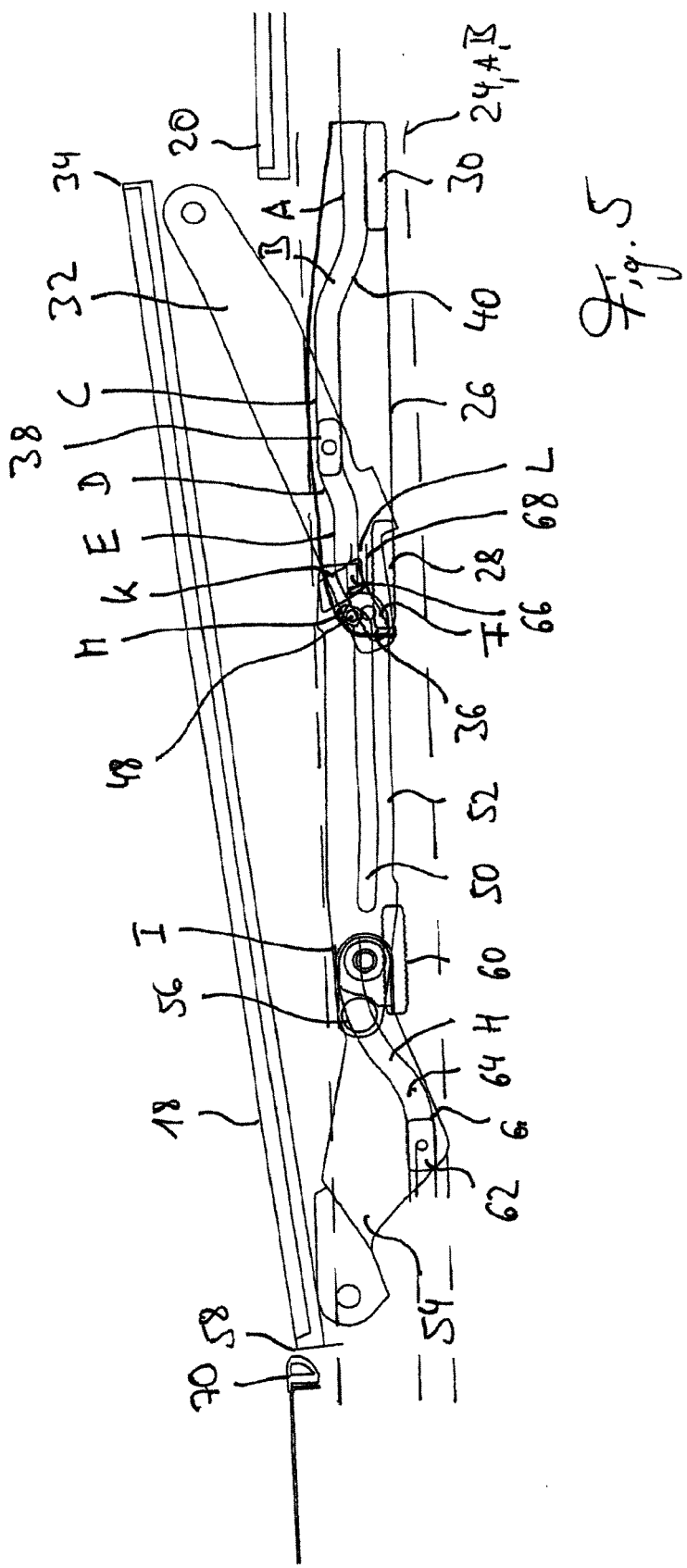
FIG. 5 is a view corresponding to FIG. 3, but during a transition of the covering element from a ventilation position to a sliding position.

If the control carriage 26 is now displaced further in the direction of the rear of the vehicle, the peg 48 in the control track 50 of the coupling lever 52 is displaced into a rear locking section M, so that the coupling lever 52 is lowered further and the locking peg 66 is moved into the horizontal region of the locking track 68, and a relative movement between the drive carriage 26 and the coupling lever 52 in the longitudinal direction of the vehicle is blocked, as shown in FIG. 5. The control mechanism, that is, the coupling lever 52, the front slide element slider 60 and the front release lever 54, are now released to be displaced in the direction of the rear of the vehicle.

Figure 6:
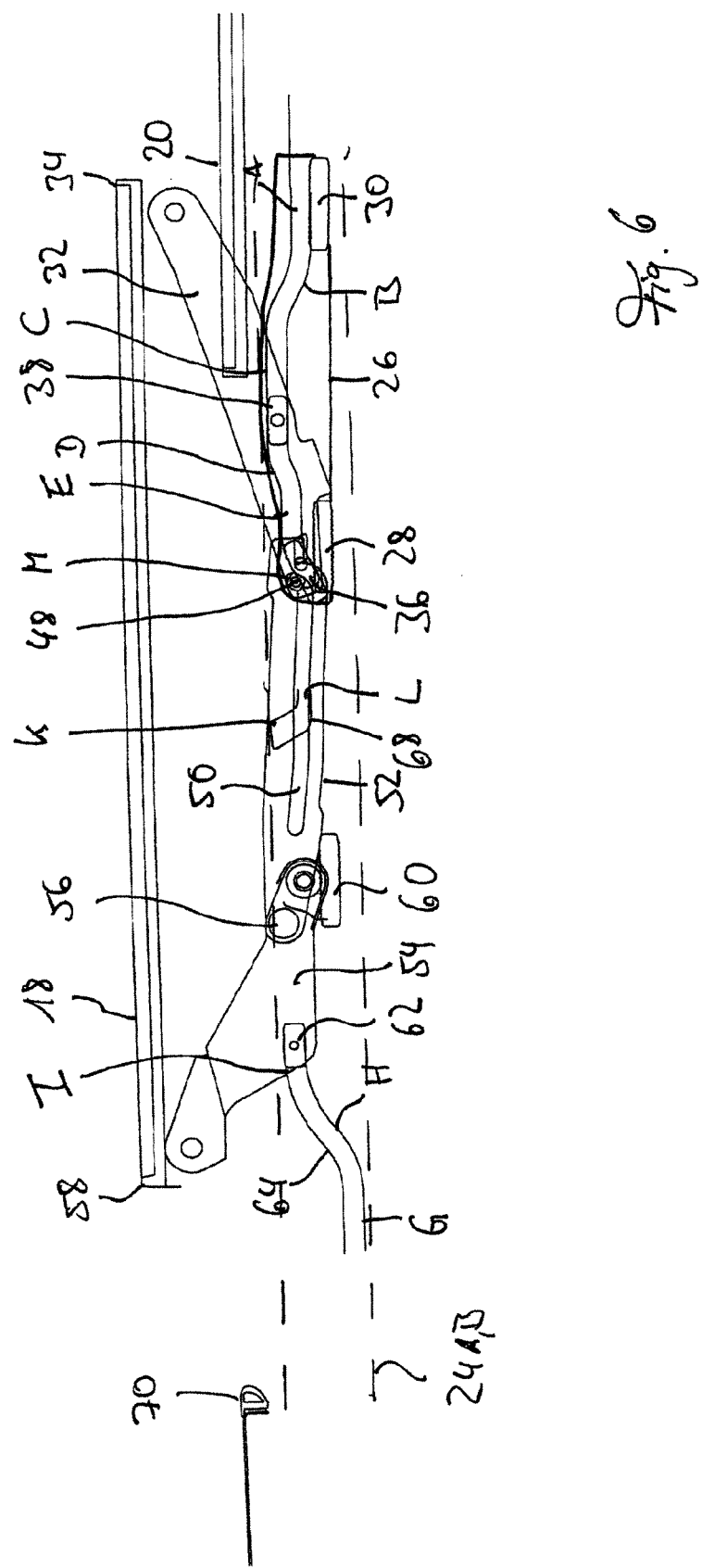
FIG. 6 is a view corresponding to FIG. 3, but during the opening movement of the covering element.
Figure 7:
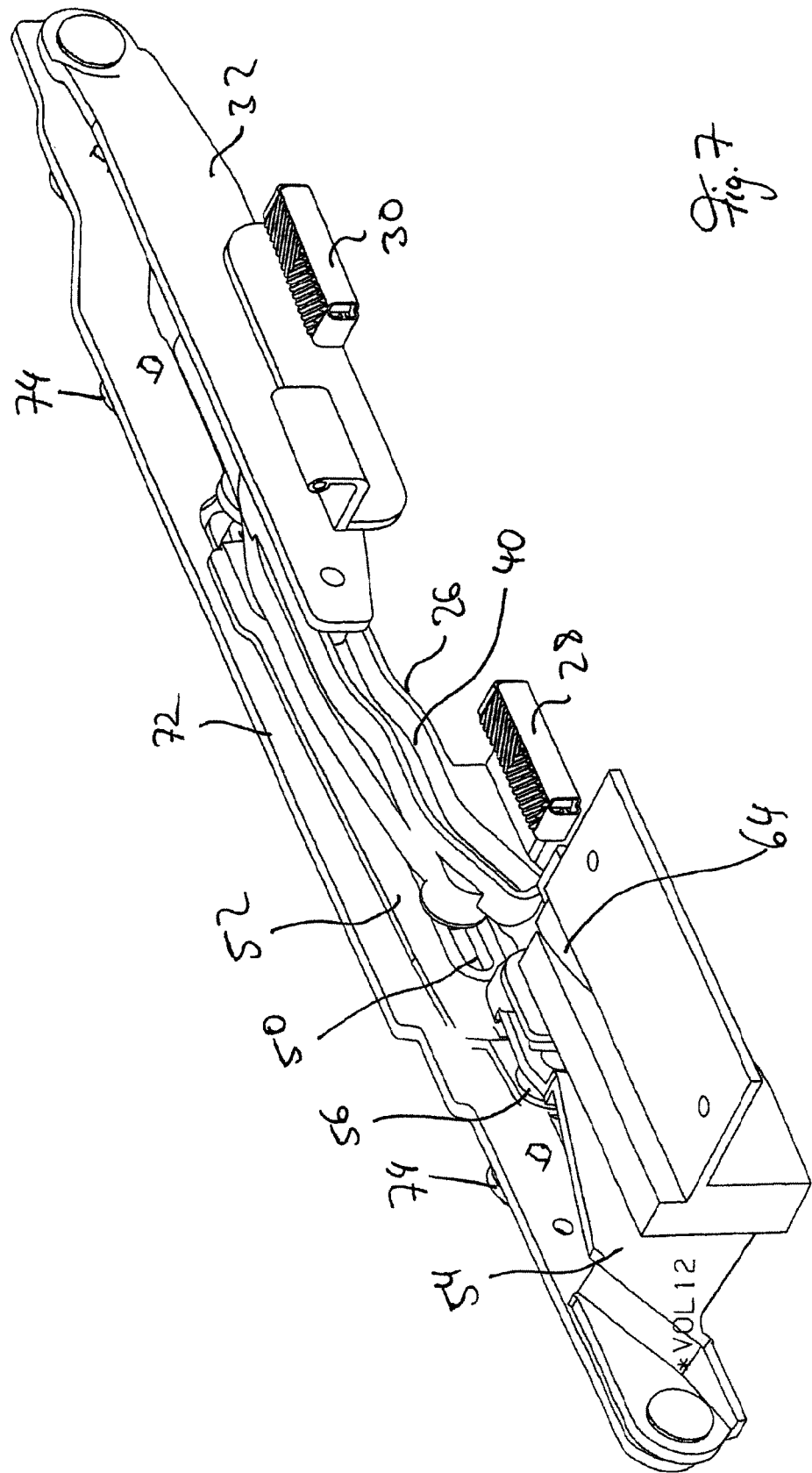
FIG. 7 is a perspective side view of the control mechanism in the closed position.
Figure 8:
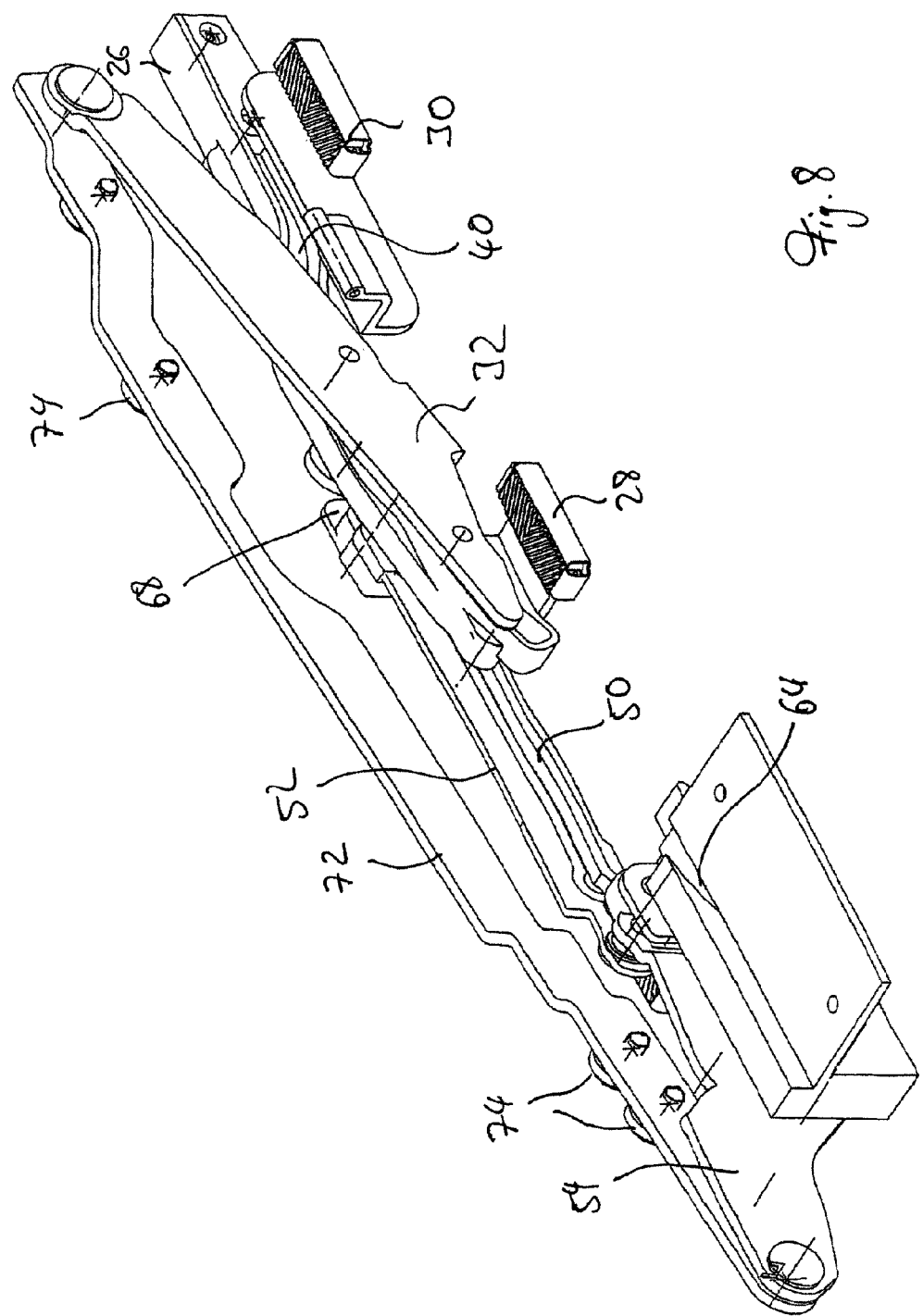
FIG. 8 is a view of the control mechanism corresponding to FIG. 7, but in the ventilation position of the covering element.
Figure 9:
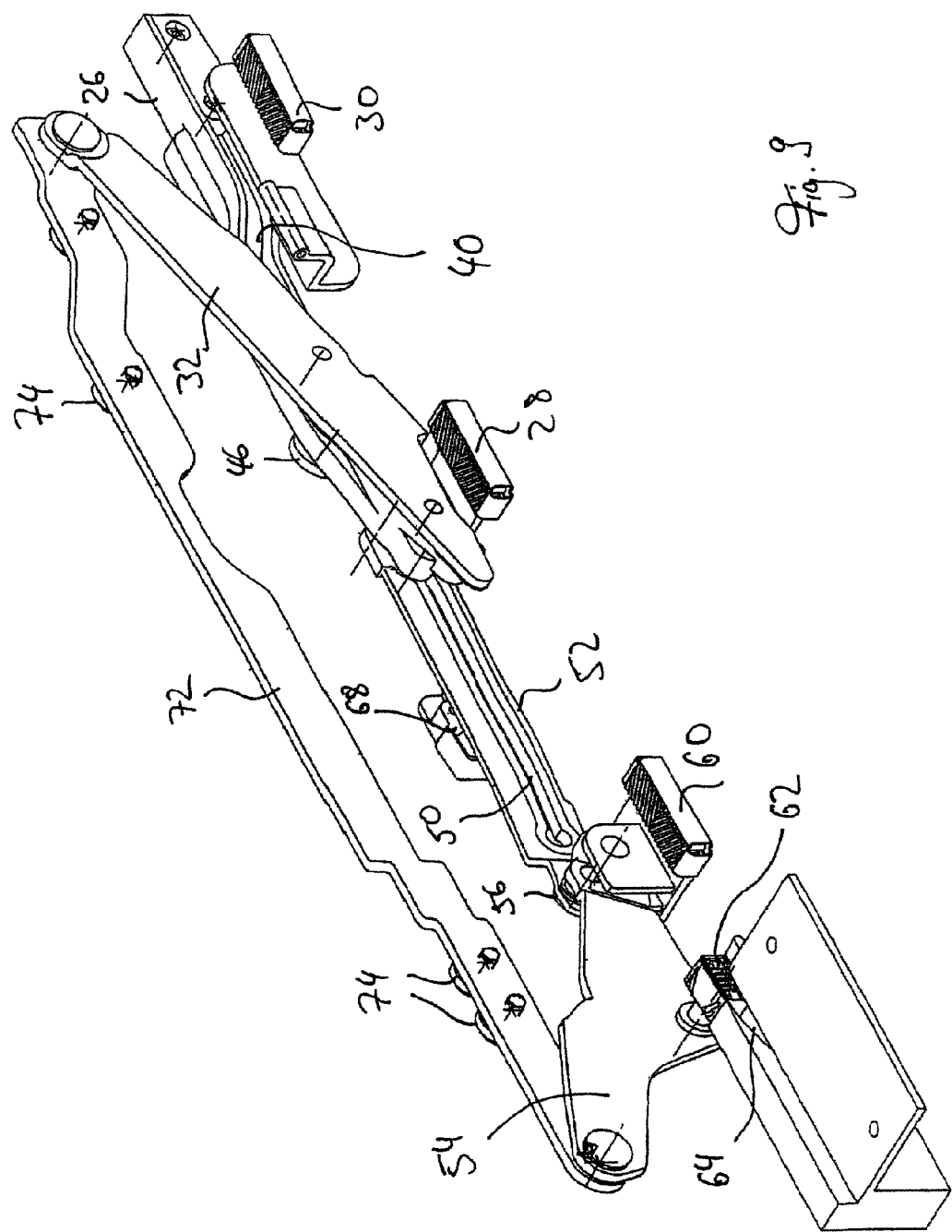
FIG. 9 is a view of the control mechanism corresponding to FIG. 7, but during displacement of the covering element.
Figure 10:
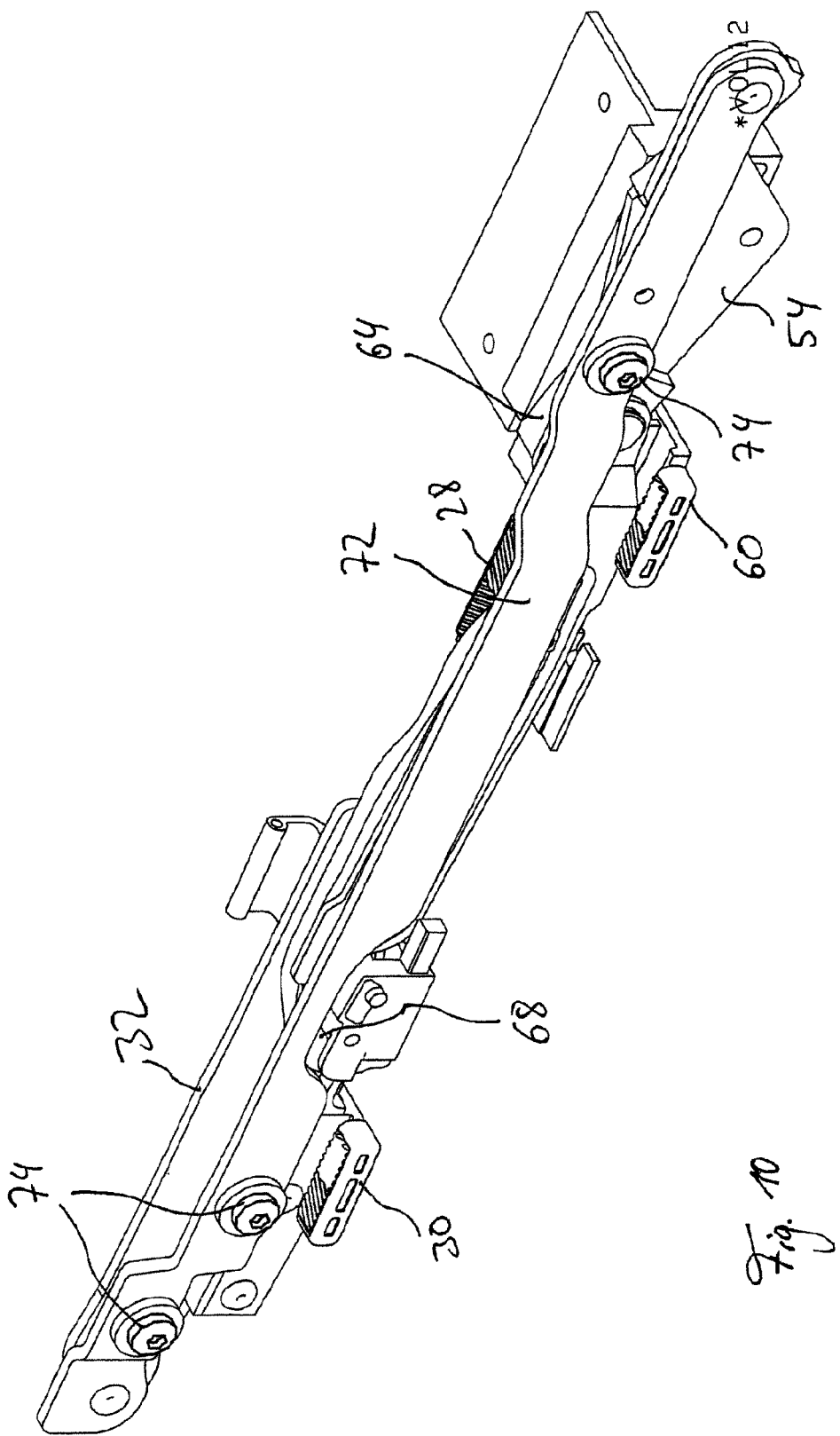
FIG. 10 is a further side view of the control mechanism in the closed position of the covering element.
Figure 11:
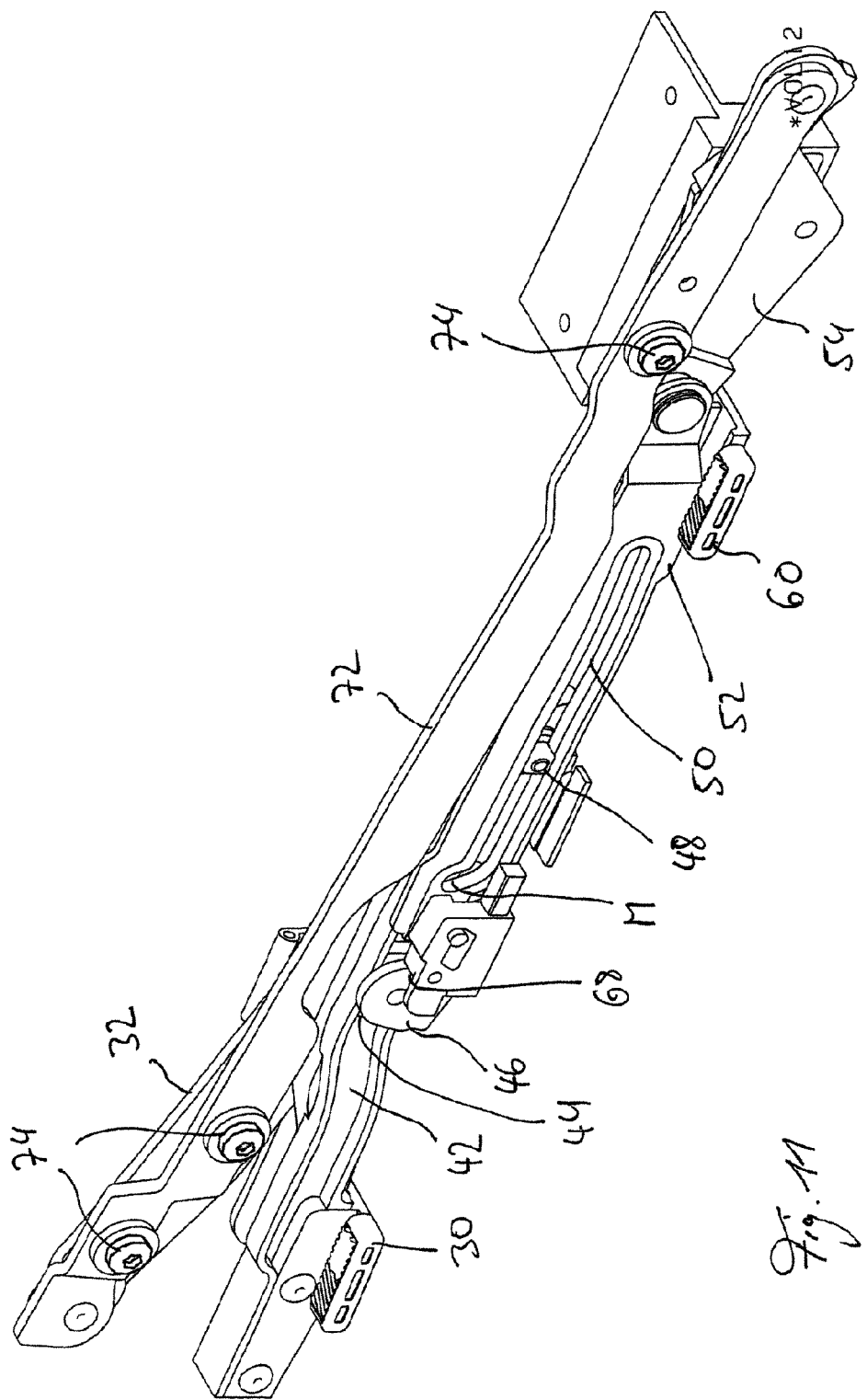
FIG. 11 is a view of the control mechanism corresponding to FIG. 10, but in the ventilation position of the covering element.
Figure 12:
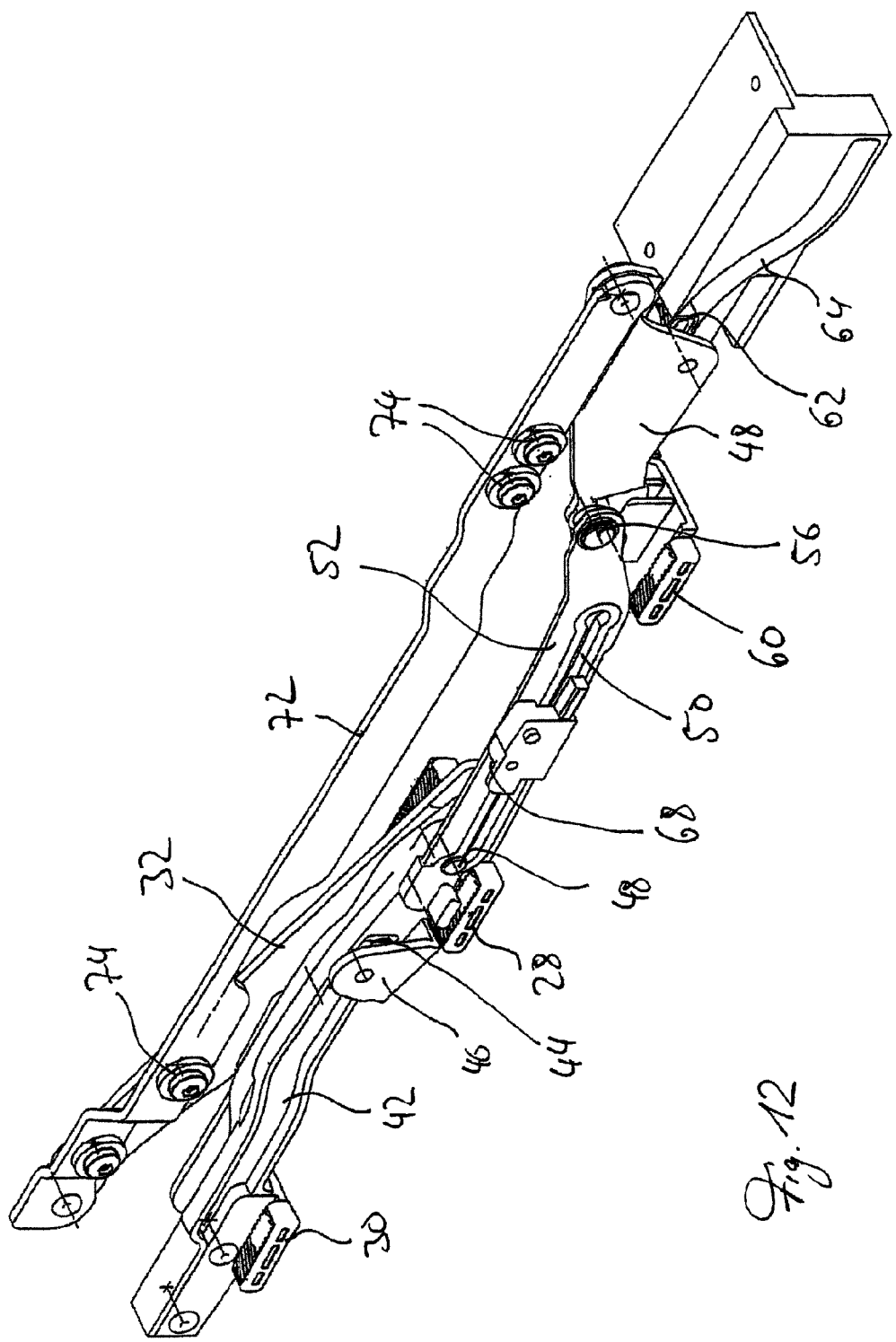
FIG. 12 is a view of the control mechanism corresponding to FIG. 10, but during displacement of the covering element.

The further displacement of the drive carriage 26 now causes the control element 62 of the front release lever 54 to be displaced in the direction of the rear of the vehicle in the front guide track 64 connected rigidly to the guide rail, so that the release lever 54 is subjected to a deployment movement, as shown in FIGS. 6, 9 and 12. Through the rotational or swiveling movement of the front release lever 54, the rear release lever 32 is lowered slightly, since both release levers 32, 54 are connected to one another via rotary joints on the covering element carrier 70. This movement is advantageous in order that the covering element 18 can now be pulled over the fixed rear roof section 20 with a clearance as small as possible. As this happens, the two release levers 32 and 34 slide in the manner of sword blades in the respective slot-shaped rear recess between the fixed rear roof section 20 and the respective roof side member 22A, 22B.

The closing operation takes place in the reverse sequence.

REFERENCE NUMERALS

10 Motor vehicle
12 Vehicle roof
14 Windscreen cowl
16 Roof opening
18 Covering element
20 Fixed roof section
22A, 22B Roof side member
24A, 24B Guide rail
26 Drive carriage
28 Slide element
30 Slide element
32 Rear release lever
34 Rear edge
36 Control element
38 Control element
40 Rear guide track 42 Guide track
44 Control element
46 Bracket
48 Peg
50 Control track
52 Coupling lever
54 Front release lever
56 Stud
58 Front edge
60 Slider
62 Control element
64 Front guide track
66 Locking peg
68 Locking channel
70 Seal
72 Covering element carrier
74 Screw fixings

The invention claimed is:

1. A vehicle roof with a covering element that can be raised and displaced above a fixed roof section for selective closing or at least partial opening of a roof opening, comprising a respective control mechanism for the covering element on each side thereof, each control mechanism cooperating with a respective guide rail, wherein the control mechanism comprises a drive carriage connected to a drive cable, a rear release lever that is articulated to the covering element in the region of the rear edge thereof, a front release lever that is articulated to the covering element in the region of the front edge thereof, and a coupling lever that is rotatably connected to the front release lever, wherein the coupling lever cooperates with the drive carriage and wherein, starting from a front end position, a rearward displacement of the drive carriage in a control track of the coupling lever causes an outward swiveling of the rear release lever controlled by a rear guide track and, upon the drive carriage attaining an abutment in the control track of the coupling lever, further rearward displacement of the drive carriage causes a displacement of the covering element and an outward swiveling of the front release lever controlled by a front guide track.

2. The vehicle roof as claimed in claim 1, wherein the rear guide track is formed on the drive carriage.

3. The vehicle roof as claimed in claim 2, wherein the rear release lever is guided by a front and a rear control slider in the rear guide track of the drive carriage.

4. The vehicle roof as claimed in claim 1, wherein the front guide track, which controls the swiveling movement of the front release lever, is rigidly connected to the roof and adjoins a guide track of the guide rail.

5. The vehicle roof as claimed in claim 1, wherein during displacement of the covering element, the abutment blocks relative movement between the drive carriage and the coupling lever.

6. The vehicle roof as claimed in claim 1, wherein by a swiveling movement of the coupling lever as the rear release lever is deployed, which swiveling movement is associated with a displacement of the coupling lever in the longitudinal direction of the vehicle, a front edge of the covering element is moved away from a front edge of the roof opening as the rear release lever is deployed.

7. The vehicle roof as claimed in claim 6, wherein the swiveling movement of the coupling lever is effected by the control track and by displacement of the drive carriage.

8. The vehicle roof as claimed in claim 7, wherein the control track is formed on the coupling lever and has a rear locking section in which a peg of the drive carriage is arranged during displacement of the covering element.

9. The vehicle roof as claimed in claim 1, wherein the connection between the coupling lever and the front release lever is effected in the region of a front slide element which is guided in the respective guide rail.

10. The vehicle roof as claimed in claim 1, wherein the front release lever and the rear release lever are connected to one another via a covering element carrier.

* * * * *